(12) United States Patent
Hern et al.

(10) Patent No.: US 10,345,004 B1
(45) Date of Patent: Jul. 9, 2019

(54) INTEGRATED HEAT PUMP AND WATER HEATING CIRCUIT

(71) Applicant: Climate Master, Inc., Oklahoma City, OK (US)

(72) Inventors: Shawn A. Hern, El Reno, OK (US); Dennis L. Harris, Bluffton, IN (US)

(73) Assignee: Climate Master, Inc., Oklahoma City, OK (US)

( * ) Notice: Subject to any disclaimer, the term of this patent is extended or adjusted under 35 U.S.C. 154(b) by 0 days.

(21) Appl. No.: 14/841,799

(22) Filed: Sep. 1, 2015

(51) Int. Cl.
*F24H 4/04* (2006.01)

(52) U.S. Cl.
CPC ...................................... *F24H 4/04* (2013.01)

(58) Field of Classification Search
CPC .............................. B60H 1/3204; F24H 4/04
USPC .......................................................... 62/115
See application file for complete search history.

(56) References Cited

U.S. PATENT DOCUMENTS

| | | |
|---|---|---|
| 3,916,638 A | 11/1975 | Schmidt |
| 3,938,352 A | 2/1976 | Schmidt |
| 4,072,187 A | 2/1978 | Lodge |
| 4,179,894 A | 12/1979 | Hughes |
| 4,299,098 A | 11/1981 | Derosier |
| 4,399,664 A | 8/1983 | Derosier |
| 4,528,822 A | 7/1985 | Glamm |
| 4,598,557 A | 7/1986 | Robinson et al. |
| 4,645,908 A | 2/1987 | Jones |
| 4,646,538 A | 3/1987 | Blackshaw et al. |
| 4,693,089 A | 9/1987 | Bourne et al. |
| 4,776,180 A | 10/1988 | Patton et al. |
| 4,798,059 A | 1/1989 | Morita |
| 4,924,681 A | 5/1990 | De Vit et al. |
| 5,081,848 A | 1/1992 | Rawlings et al. |
| 5,339,890 A | 8/1994 | Rawlings |
| 5,372,016 A | 12/1994 | Rawlings |
| 5,477,914 A | 12/1995 | Rawlings |
| 5,533,355 A | 7/1996 | Rawlings |

(Continued)

FOREIGN PATENT DOCUMENTS

| | | |
|---|---|---|
| EP | 0134015 A2 | 3/1985 |
| JP | 2000016417 A | 2/2000 |

(Continued)

OTHER PUBLICATIONS

International Search Report and Written Opinion issued in International Application No. PCT/US2013/033433 dated Aug. 9, 2013 (11 pages).

(Continued)

*Primary Examiner* — Ana M Vazquez
(74) *Attorney, Agent, or Firm* — Neal, Gerber & Eisenberg LLP; Thomas E. Williams

(57) ABSTRACT

An integrated heat pump and water heating circuit for space heating and cooling and heating domestic water. The circuit includes a first heat exchanger for the domestic water, a second heat exchanger for the source, a third exchanger for the space, and a variable capacity compressor. The circuit has four modes of operation. In the first mode, the space is cooled. In the second mode, the space is heated. In the third mode, the circuit heats the water supply. In a fourth mode, the water supply is heated and the space is cooled simultaneously. The speed of the compressor is adjusted to maintain a pressure differential at or above a predetermined set point.

22 Claims, 6 Drawing Sheets

(56) References Cited

U.S. PATENT DOCUMENTS

| | | | |
|---|---|---|---|
| 5,564,282 A | 10/1996 | Kaye | |
| 5,651,265 A | 7/1997 | Grenier | |
| 6,253,564 B1 | 7/2001 | Yarbrough et al. | |
| 6,385,983 B1 | 5/2002 | Sakki et al. | |
| 7,913,501 B2 | 3/2011 | Ellis et al. | |
| 7,937,960 B2 * | 5/2011 | Matsui | F24F 3/1411 236/44 A |
| 8,756,943 B2 | 6/2014 | Chen et al. | |
| 2006/0218949 A1 | 10/2006 | Ellis et al. | |
| 2008/0041072 A1 * | 2/2008 | Seefeldt | F24D 3/12 62/117 |
| 2008/0302118 A1 * | 12/2008 | Chen | F25B 9/008 62/230 |
| 2010/0064722 A1 | 3/2010 | Taras | |
| 2010/0077788 A1 | 4/2010 | Lewis | |
| 2011/0259025 A1 | 10/2011 | Noh et al. | |
| 2011/0289952 A1 | 12/2011 | Kim et al. | |
| 2012/0291460 A1 | 11/2012 | Aoyagi | |
| 2013/0104574 A1 | 5/2013 | Dempsey et al. | |
| 2014/0123689 A1 | 5/2014 | Ellis et al. | |
| 2014/0245770 A1 | 9/2014 | Chen et al. | |
| 2014/0260392 A1 | 9/2014 | Hawkins et al. | |
| 2015/0204586 A1 | 7/2015 | Burg et al. | |

FOREIGN PATENT DOCUMENTS

| | | |
|---|---|---|
| WO | 9600370 | 1/1996 |
| WO | 2013/142760 | 9/2013 |

OTHER PUBLICATIONS

International Preliminary Report on Patentability issued in International Application No. PCT/US2013/033433 dated Sep. 23, 2014 (7 pages).

Third Party Submission dated Nov. 10, 2014 filed in U.S. Appl. No. 13/848,342 (13 pages).

Honeywell, VFF1, VFF2, VFF3, VFF6 Resilient Seat Butterfly Valves with Flanged Connections Jan. 2013, p. 1, 1st column, last paragraph. (Year: 2013) (20 pages).

Taras, Michael F., "Reheat Which Concept is Best," *ASHRAE Journal*: 35-40 (Dec. 2004) (7 pages).

\* cited by examiner

US 10,345,004 B1

INTEGRATED HEAT PUMP AND WATER HEATING CIRCUIT

STATEMENT REGARDING FEDERALLY SPONSORED RESEARCH AND DEVELOPMENT

The invention was made under a CRADA NFE-07-01000 between Climate Master, Inc., and UT-Batelle, LLC, Operating and Management Contractor of the Oak Ridge National Laboratory operated for the United States Department of Energy. The Government has certain rights in the invention.

FIELD OF THE INVENTION

The present invention relates generally to heating, ventilation, and air conditioning methods and systems and, more particularly but without limitation, to heat pump systems.

BRIEF DESCRIPTION OF THE DRAWINGS

The accompanying drawings, which are incorporated into and form a part of the specification, illustrate one or more embodiments of the present invention and, together with this description, serve to explain the principles of the invention. The drawings merely illustrate preferred embodiments of the invention and are not to be construed as limiting the scope of the invention.

DETAILED DESCRIPTION OF THE PREFERRED EMBODIMENT(S)

Figure 1:
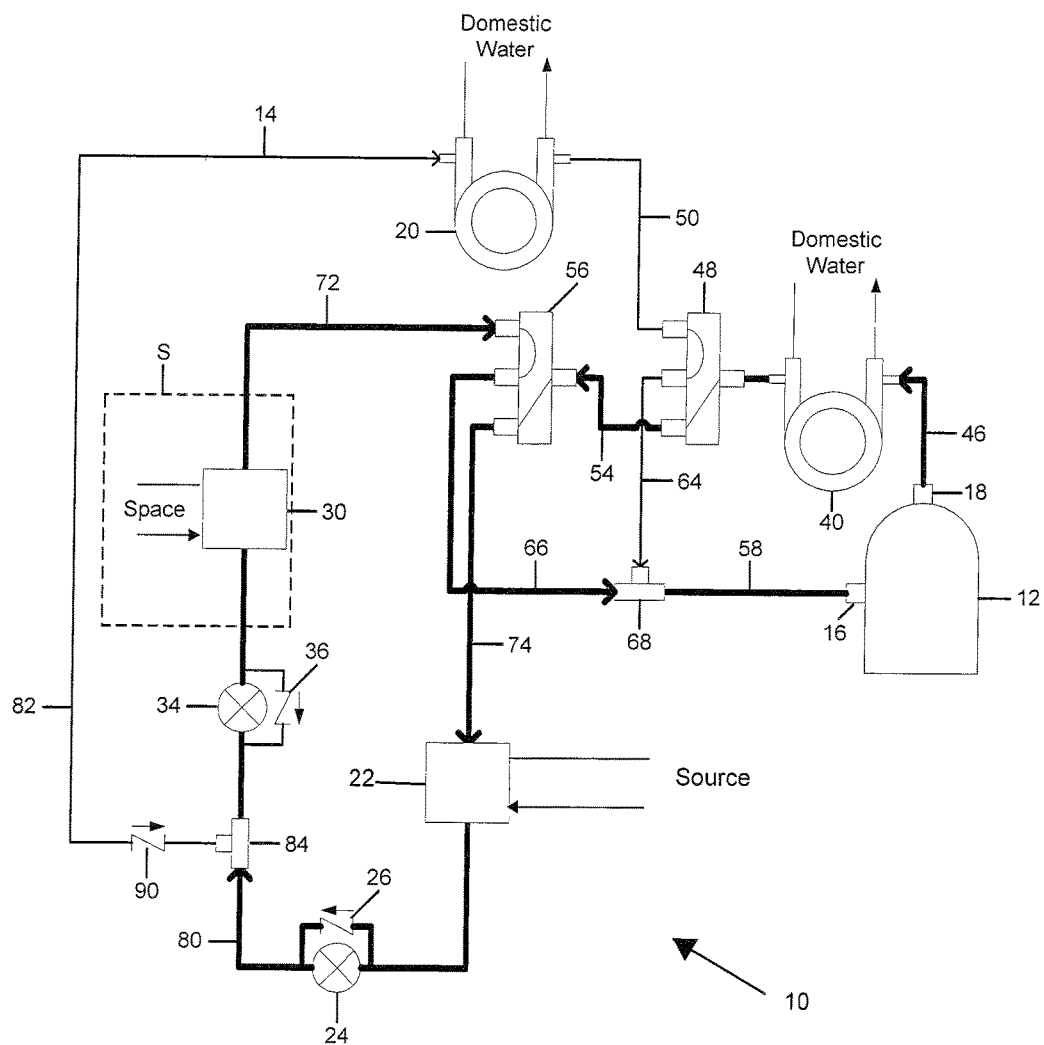
FIG. 1 is a schematic diagram of an integrated heat pump and water heating circuit constructed in accordance with a first preferred embodiment of the present invention. The bolded line illustrates the refrigerant flow path when the system is operating in a first space cooling only mode.

Modern space heating and cooling systems are increasingly improving in efficiency decreasing the energy used to condition buildings. As this energy use is reduced, other energy using items, specifically heating domestic water, become an increasingly large part of the building's energy usage. One promising approach to reduce building energy consumption is through a single integrated heat pump system to condition the space and heat the domestic water. The energy benefits of this system stem from the ability to utilize otherwise wasted energy; for example, heat rejected by the space cooling operation can be used for water heating.

The present invention comprises a refrigeration circuit that has four modes of operation: cooling a space, heating a space, heating water, and simultaneously cooling a space while heating water. Furthermore, the improved refrigeration circuit is designed such that passive charge control is provided by reclaiming charge from the inactive heater exchanger to the suction side of the compressor along with minimizing valves required for proper operation in any of the four modes.

Now it will be appreciated that systems, such as the integrated system of the present invention, offers increased economy because heat exchange components (heat exchangers, compressor, and expansion devices) operate in more than one mode—for conditioning the air in the space and for heating the domestic water supply. However, when the system is heating the domestic water supply, the load placed on the compressor may become excessive. In accordance with the present invention, the control system may include a routine for monitoring the compressor's pressure differential and for adjusting the compressor's speed to manage the refrigerant load.

Turning now to the drawings in general and to FIG. 1 in particular a first preferred embodiment of the circuit of the present invention will be described. The circuit, designated generally by the reference number 10, includes a compressor 12 and a plurality of heat exchangers interconnected in a conduit assembly 14. The compressor 12 includes an inlet 16 on the suction side and an outlet 18 on the discharge side. The compressor 12 circulates refrigerant through the circuit 10. Most preferably, the compressor 12 is a variable capacity compressor, as this will permit modulation of the compressor speed to manage the refrigerant load.

The plurality of heat exchangers includes a first heat exchanger 20 fluidly connectable to the structure's domestic water supply. The water supply heat exchanger 20 is operable as a condenser to heat the water supply. In most instances, the water supply heat exchanger will be a refrigerant-to-water heat exchanger.

Also included is a second heat exchanger 22 fluidly connectable to the heat pump's source. As used herein, "source" refers to a source such as water or air that serves as a heat sink or heat source. The source heat exchanger 22 is operable alternately as an evaporator and a condenser to selectively reject heat to or absorb heat from the source. In most instances, the source heat exchanger will be a refrigerant-to-water heat exchanger and the source will be water. However, other types of heat exchangers may be substituted. For example, for an outside air source, the heat exchanger may be a refrigerant-to-air type.

A first one-way expansion valve preferably is included in the conduit assembly 14 and is dedicated to the source heat exchanger 22, that is, it serves only the source heat exchanger. The first expansion valve is positioned to meter refrigerant only entering the source heat exchanger 22 and only when it is operating as an evaporator. In the embodiment of FIG. 1, the expansion valve comprises an electronic expansion valve 24 and a check valve 26. The electronic expansion valve 24 meters refrigerant only when the heat exchanger 22 is operating as an evaporator and otherwise remains completely closed. The check valve 26 allows unrestricted flow of refrigerant in the direction opposite to that of the one-way expansion valve.

Referring still to FIG. 1, the refrigerant circuit 10 includes a third heat exchanger 30 fluidly connected to the space in the structure "S" to heat and cool the space. Thus, the space heat exchanger 30 is operable alternately as an evaporator and a condenser. In most instances, the space heat exchanger will be a refrigerant-to-air heat exchanger. However, other types of heat exchangers may be substituted. For example, for a radiant type heating system, the heat exchanger may be a refrigerant-to-water type.

A second one-way expansion valve preferably is included in the conduit assembly 14 and is dedicated to the space heat exchanger, that is, it is positioned to meter refrigerant only entering the source heat exchanger 30 and only when it is operating as an evaporator. In this embodiment, the expansion valve comprises an electronic expansion valve 34 and a check valve 36. The electronic expansion valve 34 meters refrigerant only when the heat exchanger 30 is operating as an evaporator and otherwise remains completely closed. The check valve 36 allows unrestricted flow of refrigerant in the direction opposite to that of the one-way expansion valve.

A desuperheater 40 may be included in the circuit 10. The desuperheater 40 is fluidly connectable to the domestic water supply and may be a refrigerant-to-water heat exchanger.

The conduit assembly includes conduits connecting the various components of the circuit 10. A discharge line 46 connects the compressor 12 to the desuperheater 40. The outlet of the desuperheater 40 is connected to the inlet port of a four-way diverting valve 48. One port of the diverting valve 48 connects to one side of the water supply heat exchanger 20 through the conduit 50. Another port of the diverting valve 48 connects via the conduit 54 to the inlet port of a four-way reversing valve 56. The fourth port of the diverting valve 48 is connected to the suction line 58 by means of the conduit 64.

One port of the reversing valve 56 connects to the suction line 58 to the inlet 16 of the compressor 12 through the conduit 66 and the three way coupling 68. Another port of the reversing valve 56 connects to the space heat exchanger 30 by the conduit 72. The fourth port of the reversing valve 56 connects to the source heat exchanger 22 by the conduit 74.

The conduit 80 connects the source heat exchanger 22 to the space heat exchanger 30. A conduit 82 connects the water supply heat exchanger 20 to the conduit 80 through the three way coupling 84.

Now it will be apparent that the preferred refrigerant circuit 10 includes an assembly of valves in the conduit assembly 14 configured to direct refrigerant between the compressor 12 and the heat exchangers 20, 22, 30, and 40. The valve assembly is configured to selectively direct the refrigerant in four different paths to provide four operating modes. The four modes of operation include a first space-cooling-only mode, a second space-heating-only mode, a third water-heating-only mode, and a fourth mode in which the water supply is heated and the space is cooled simultaneously. To that end, the preferred valve assembly includes the previously described diverting valve 48, the reversing valve 56, and the check valves 26, 36 and 90. The one-way expansion valves 24 and 34 also participate in directing the refrigerant according to the four modes. The operation of these valves to achieve the four different operating modes now will be explained.

The first flow path for the refrigerant through the circuit 10 is illustrated in FIG. 1 by the thicker lines. This flow path provides the first mode, that is, the mode in which only cooling of the space is provided. Refrigerant fluid leaving the compressor outlet 18 through the discharge line 46 passes through the desuperheater 40, where heat can be rejected to the domestic water. From the desuperheater 40, fluid enters the diverting valve 48. The diverting valve 48 directs the refrigerant through the conduit 54 to the reversing valve 56, which then routes it to the source heat exchanger 22 through the conduit 74, where heat is rejected to the source.

Fluid leaving the heat exchanger 22 passes through the conduit 80 to the space heat exchanger 30. In this path, the high pressure fluid passes through the check valve 26, bypassing the expansion valve 24, which is closed, and entering the expansion valve 34, as the check valve 36 is closed to flow in this direction. The refrigerant is metered in the expansion valve 34 prior to entering the heat exchanger 30, which in this mode is operating as an evaporator, absorbing heat from the space to cool the space.

Refrigerant vapor exits the heat exchanger/evaporator 30 and flows to the reversing valve 56 through the conduit 72. The reversing valve 56 in turn directs the fluid through the conduit 66 into the suction line 58 of the compressor 12. Now it will be apparent that the expansion valves 24 and 34 act also as directional valves to route the refrigerant through the circuit as well as to meter the refrigerant as it enters an evaporator. It should also be noted that in this mode condensed refrigerant is prevented from entering the hot water heat exchanger 20 by the check valve 90. At the same time, the water supply heat exchanger 20, which is inactive in this mode, is reclaimed as the diverting valve 48 opens the exchanger 20 to the suction line 58 through the conduits 50 and 64. Therefore, any refrigerant present in the water supply heat exchanger 20 will be evaporated and pulled back into the active refrigerant circuit for proper operation.

Figure 2:
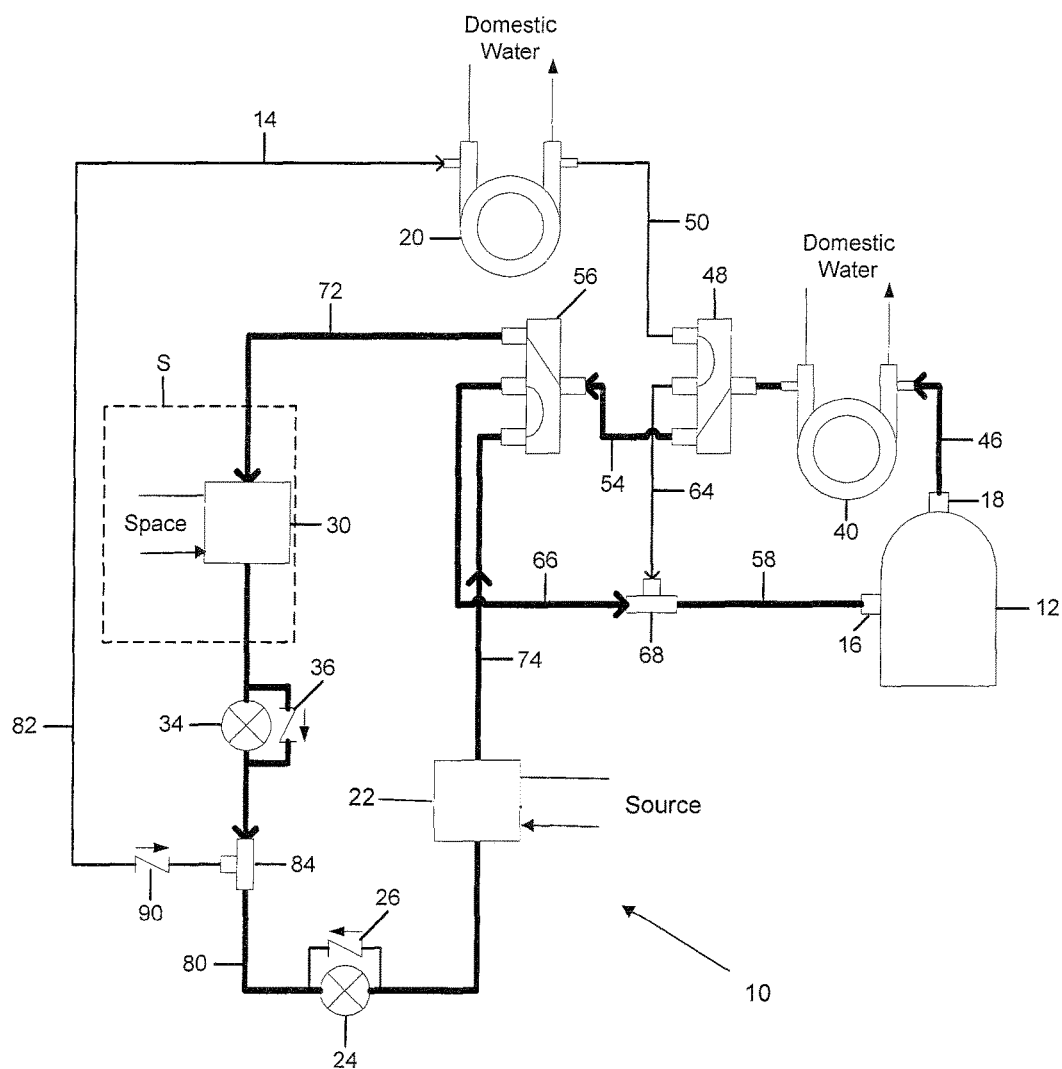
FIG. 2 is a schematic diagram of the circuit of FIG. 1 illustrating the refrigerant flow path when the system is operating in a second space heating only mode.

Turning now to FIG. 2, the second mode of operation will be described. In this mode, the space is heated. In this flow path, the compressor 12 discharges high-pressure refrigerant vapor through conduit 46 to the desuperheater 40, where heat can be rejected to the domestic water. The fluid passes from the desuperheater 40 to the diverting valve 48 and then to the reversing valve 56 from which is routed to the space heat exchanger 30 through the conduit 72. In this mode, the heat exchanger 30 is operating as a condenser to heat the space "S."

High-pressure liquid then leaves the space heat exchanger 30 in the conduit 80 bypassing the expansion device 34, which is closed, and passing through the check valve 36 instead. From here, the fluid passes through the expansion valve 24, the check valve 26 being closed to flow in this direction. Expanded low-pressure refrigerant is metered into the source heat exchanger 22, which in this mode is operating as an evaporator, absorbing heat. Refrigerant vapor exits the heat exchanger 22 and passes to the reversing valve 56 through the conduit 74 and then to the suction line 58 through the conduit 66. As in space cooling mode, liquid refrigerant is prevented from entering the water supply heat exchanger 20 by the check valve 90. In this mode, the heat exchanger 20 is inactive, but this heat exchanger is reclaimed to the suction line 58 of the compressor 12 through the conduits 50 and 60 and the diverting valve 48, thereby providing proper refrigerant charge control.

Figure 3:
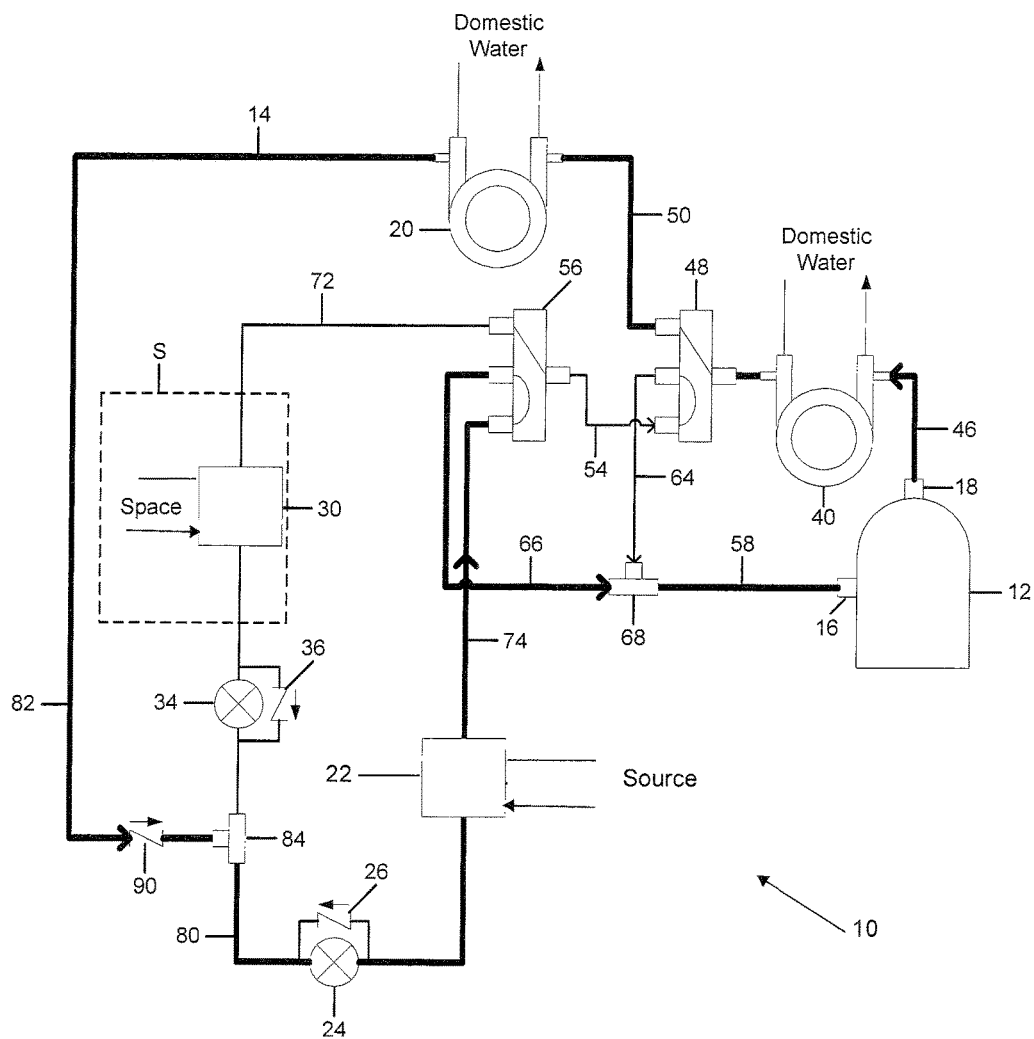
FIG. 3 is a schematic diagram of the circuit of FIG. 1 illustrating the refrigerant flow path when the system is operating in a third water heating only mode.

With reference now to FIG. 3, the third mode of operation will be described. In this mode, the circuit 10 is used to heat the domestic water supply. The compressor 12 discharges high-pressure refrigerant vapor through the desuperheater 40, and is directed by the diverting valve 48 to the water supply heat exchanger 20 through the conduit 50. High-pressure liquid, having rejected heat to the water supply, leaves the heat exchanger 20 through the conduit 82 and passes through the check valve 90, open in this direction, into the conduit 80. The electronic expansion device 34 is closed in this mode, so the fluid is routed through the expansion valve 24 and metered into the source heat exchanger 22, which in this mode is operating as an evaporator, absorbing heat from the water source.

Refrigerant vapor exits the heat exchanger 22 through the conduit 74 and is returned to the compressor 12 through the reversing valve 56, which directs the fluid into the conduit 66 and suction line 58. In this mode, liquid refrigerant is prevented from entering the space heat exchanger by check valve 36 and closed electronic expansion valve 34. In this mode, the space heat exchanger 30 is inactive, but it is reclaimed to the suction line 58 of the compressor 12 through the conduits 72, 54, and 64 and valves 48 and 56 so as to maintain proper refrigerant charge control.

Figure 4:
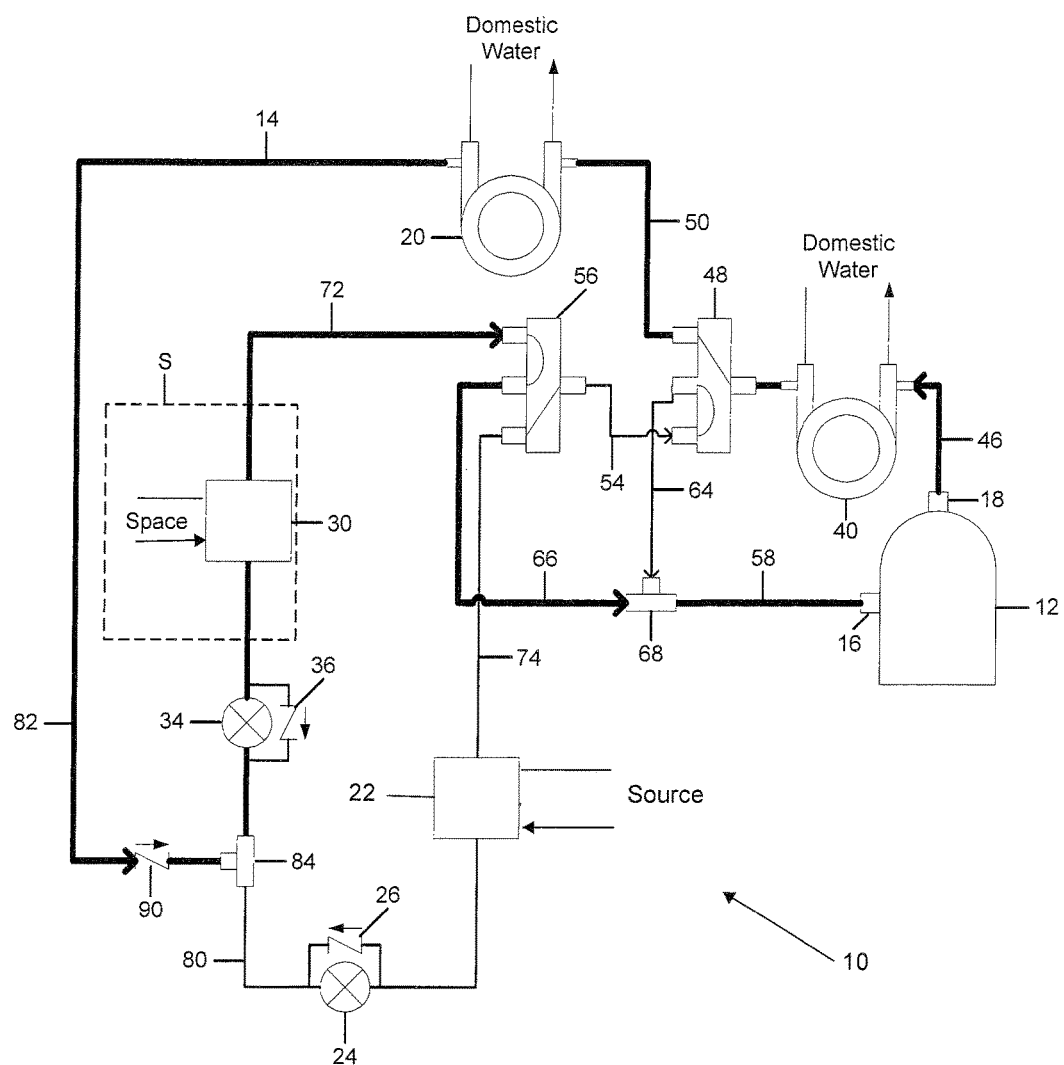
FIG. 4 is a schematic diagram of the circuit of FIG. 1 illustrating the refrigerant flow path when the system is operating in a fourth mode in which the space is cooled and the domestic water supply is heated simultaneously.

To simultaneously cool the space and heat water, the refrigerant circuit 10 is operated in the mode depicted in FIG. 4. The compressor 12 discharges high-pressure refrigerant vapor through the desuperheater 40 and then to the diverting valve 48. The diverting valve 48 directs the fluid to the water supply heat exchanger 20 through the conduit 50, where heat is rejected to the structure's water supply. High-pressure liquid then leaves the water supply heat exchanger 20 and travels through check valve 90 in the conduit 82 to the expansion device 34, where it is metered into a low-pressure liquid traveling to the space heat exchanger 30, where it evaporates, absorbing heat from the space.

Refrigerant vapor exits the space heat exchanger 30 and flows through the conduit 72 to the reversing valve 56 from which it is returned to the compressor suction line 58 through the conduit 66. During this mode of operation, the source heat exchanger 22 is inactive, and liquid refrigerant is prevented from entering this heat exchanger by the check valve 26 and the electronic expansion valve 24, which is closed. Thus, the source heat exchanger 22 is reclaimed to the suction line 58 of the compressor 12 through the conduit 74 and 66 and the reversing valve 56 to insure proper refrigerant charge control.

Figure 5:
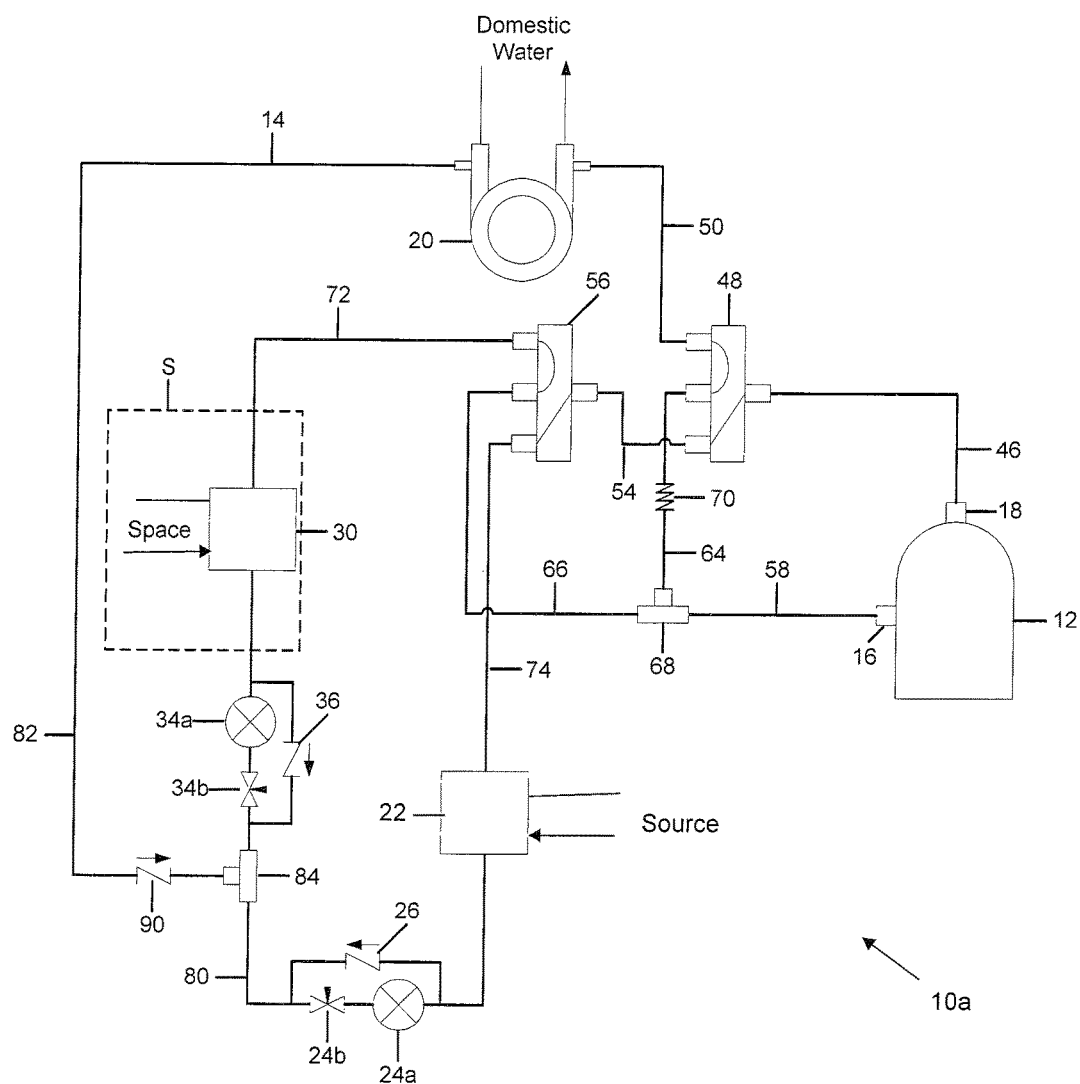
FIG. 5 is a schematic diagram of an integrated heat pump and water heating circuit constructed in accordance with a second preferred embodiment of the present invention.

FIG. 5 illustrates another embodiment of the refrigerant circuit present invention, which is designated generally by the reference number 10A. In this figure, no flow path is highlighted, as it will function similarly in the same modes as previously described. In this embodiment, the circuit 10A comprises the same compressor 12, domestic water heat exchanger 20, source heat exchanger 22, and space heat exchanger 30. Similarly, the valve assembly of this embodiment includes the same diverting valve 48 and reversing valve 56, as well as the check valves 26, 36, and 90. However, the desuperheater is omitted. Additionally, the electronic expansion valves 24 and 34 in the previous embodiment each have been replaced with a mechanical expansion valve 24a and 34a. Since mechanical expansion valves may not close tightly and typically will allow some reverse migration of refrigerant, each of the mechanical expansion valves is coupled with a solenoid shut-off valve 24b and 34b. Still further, a capillary tube or restrictor 70 is included in the conduit 64 between the diverting valve 48 and the suction line 58 of the compressor. This device restricts the amount of refrigerant entering the suction line 58 of the compressor 12.

In accordance with the method of the present invention, air conditioning and water heating is provided to a structure, wherein the structure has a heat pump source, a water supply, and a space to be cooled and heated. The method comprises selectively circulating refrigerant in a single refrigerant circuit, wherein the refrigerant circuit comprises a plurality of heat exchangers and a compressor interconnected by a conduit assembly. The step of circulating the refrigerant includes directing refrigerant selectively through four different fluid paths to provide four operating modes including a first space-cooling-only mode, a second space-heating-only mode, a third water-heating-only mode, and a fourth mode in which the water supply is heated and the space is cooled simultaneously.

Figure 6:
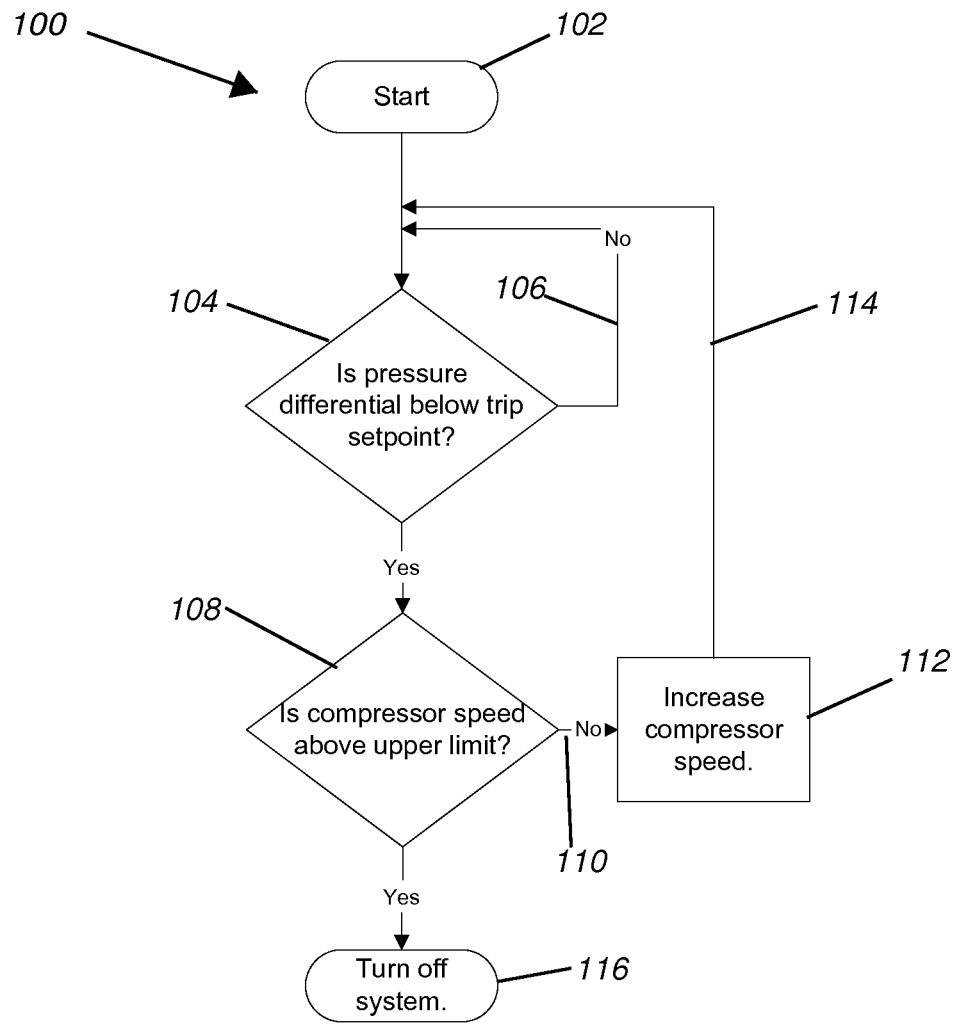
FIG. 6 is a flow chart illustrating a method for controlling compressor speed in response to inadequate pressure differential between the suction and discharge side.

Typically, when designing heat pump systems, appliance components are selected to operate over a range of conditions. As indicated previously, a variable capacity compressor is preferred in the present invention; however, certain problems can arise when a variable capacity compressor is used. For example, the reversing valve may exhibit problems switching, most frequently at start-up under low speed. To ensure proper operation of the valve, the control system may include a routine for controlling the compressor, and such a routine is illustrated by the flow chart in FIG. 6, to which attention now is directed.

The routine 100 is run in a loop to continuously monitor compressor pressure differential and to adjust the compressor speed accordingly. The routine 100 commences at START 102 at the startup of the system. At step 104, the pressure differential across the compressor 12 (FIGS. 1-5) is determined and compared to a preselected minimum differential set point. If the pressure differential is adequate, that is, if the differential is above the set point, then polling of the pressure differential is repeated at 106. This continues until the outcome is "yes," that is, when the pressure differential at the compressor 12 drops below the set point.

In response to a "yes," the system next determines the compressor speed at step 108. The speed is compared to a preselected upper speed limit based on the characteristics of the compressor 12. If the compressor speed is below the limit, a "no" outcome results in a command to increase the compressor speed a predetermined incremental amount. After each such incremental speed increase, steps 104 and 108 are repeated at 114 until the pressure differential at the compressor 12 (step 104) rises above the set point. If the compressor speed is above the upper limit, then the system is turned off at 116.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present inventions have been described in the drawings and accompanying text, the description is illustrative only. Changes may be made in the details, especially in matters of shape, size, and arrangement of the parts within the principles of the inventions to the full extent indicated by the broad meaning of the terms of the attached claims. The description and drawings of the specific embodiments herein do not point out what an infringement of this patent would be, but rather provide an example of how to use and make the invention. Likewise, the abstract is neither intended to define the invention, which is measured by the claims, nor is it intended to be limiting as to the scope of the invention in any way. Rather, the limits of the invention and the bounds of the patent protection are measured by and defined in the following claims.

What is claimed is:

1. A heat pump system, comprising:
   a variable speed compressor to circulate refrigerant through a refrigerant circuit, the compressor having an inlet and an outlet;
   a four-way diverting valve disposed on the refrigerant circuit downstream of the compressor to selectively circulate the refrigerant through the refrigerant circuit for conditioning a space and through a branch refrigerant circuit for heating domestic water;

a source heat exchanger disposed on the refrigerant circuit and operable as either a condenser or an evaporator;

a first load heat exchanger disposed on the refrigerant circuit and operable as either a condenser or an evaporator;

a reversing valve disposed on the refrigerant circuit and coupled to the four-way diverting valve, the reversing valve configured to alternately direct refrigerant flow from the four-way diverting valve to one of the source heat exchanger and the first load heat exchanger and to alternately return refrigerant flow from the other of the source heat exchanger and the first load heat exchanger to the compressor;

first and second expansion valves disposed on the refrigerant circuit and positioned between the first load heat exchanger and the source heat exchanger;

a first three-way coupler coupled to the four-way diverting valve, the reversing valve, and the compressor via the refrigerant circuit to permit the compressor to draw the refrigerant from inactive portions of the refrigerant circuit and the branch refrigerant circuit;

a second load heat exchanger disposed on the branch refrigerant circuit and coupled to the four-way diverting valve, the second load heat exchanger operable as a condenser for heating domestic water;

a second three-way coupler disposed on the refrigerant circuit between the first and second expansion valves, the second three-way coupler connecting the branch refrigerant circuit to the refrigerant circuit;

a check valve disposed on the branch refrigerant circuit to permit flow from the second load heat exchanger to the second three-way coupler; and a controller configured to monitor a pressure differential between the inlet and the outlet of the compressor and an operating speed of the compressor, wherein if the pressure differential is above a set point, the controller is configured to maintain the operating speed of the compressor;

if the pressure differential is below the set point and the operating speed of the compressor is below an upper limit, the controller is configured to increase the operating speed of the compressor, and if the pressure differential is below the set point and the operating speed of the compressor is above the upper limit, the controller is configured to stop the compressor.

2. The heat pump system of claim 1, wherein the four-way diverting valve is selectable between a first configuration to divert the refrigerant from the compressor to the reversing valve and divert the refrigerant from the second load heat exchanger to the first three-way coupler, and a second configuration to divert the refrigerant from the compressor to the second load heat exchanger and divert the refrigerant from the reversing valve to the first three-way coupler, and wherein the reversing valve is selectable between a third configuration to divert the refrigerant from the four-way diverting valve to the source heat exchanger and divert the refrigerant from the first load heat exchanger to the first three-way coupler, and a fourth configuration to divert the refrigerant from the four-way diverting valve to the first load heat exchanger and divert the refrigerant from the source heat exchanger to the first three-way coupler.

3. The heat pump system of claim 2, wherein the second load heat exchanger is inactive, the source heat exchanger rejects heat to a source, and the first load heat exchanger absorbs heat from a cooling load when the four-way diverting valve is in the first configuration, the reversing valve is in the third configuration, the first expansion valve is open, and the second expansion valve is bypassed.

4. The heat pump system of claim 3, wherein the compressor draws the refrigerant from the second load heat exchanger via the four-way diverting valve and the first three-way coupler.

5. The heat pump system of claim 2, wherein the second load heat exchanger is inactive, the source heat exchanger absorbs heat from a source, and the first load heat exchanger rejects heat to a heating load when the four-way diverting valve is in the first configuration, the reversing valve is in the fourth configuration, the first expansion valve is bypassed, and the second expansion valve is open.

6. The heat pump system of claim 5, wherein the compressor draws the refrigerant from the second load heat exchanger via the four-way diverting valve and the first three-way coupler.

7. The heat pump system of claim 2, wherein the second load heat exchanger rejects heat to the domestic hot water, the source heat exchanger absorbs heat from a source, and the first load heat exchanger is inactive when the four-way diverting valve is in the second configuration, the reversing valve is in the fourth configuration, the first expansion valve is closed, and the second expansion valve is open.

8. The heat pump system of claim 7, wherein the compressor draws the refrigerant from the first load heat exchanger via the reversing valve, the four-way diverting valve, and the first three-way coupler.

9. The heat pump system of claim 2, wherein the second load heat exchanger rejects heat to the domestic hot water, the source heat exchanger is inactive, and the first load heat exchanger absorbs heat from a cooling load when the four-way diverting valve is in the second configuration, the reversing valve is in the fourth configuration, the first expansion valve is open, and the second expansion valve is closed.

10. The heat pump system of claim 9, wherein the compressor draws the refrigerant from the source heat exchanger via the reversing valve, the four-way diverting valve, and the first three-way coupler.

11. The heat pump system of claim 1, further comprising a third load heat exchanger disposed on the refrigerant circuit between the compressor and the four-way diverting valve.

12. The heat pump system of claim 11, wherein the third load heat exchanger is a liquid-to-refrigerant heat exchanger.

13. The heat pump system of claim 11, wherein the third heat exchanger is configured to heat domestic water.

14. The heat pump system of claim 1, wherein the first load heat exchanger is an air-to-refrigerant heat exchanger to condition the space.

15. A heat pump system, comprising:
a refrigerant circuit configured to convey refrigerant;
a compressor disposed on the refrigerant circuit to circulate the refrigerant;
first and second load heat exchangers disposed on the refrigerant circuit to respectively exchange heat with first and second loads;
a source heat exchanger disposed on the refrigerant circuit to exchange heat with a source;

a first three-way coupler disposed on the refrigerant circuit between the first load heat exchanger, the second load heat exchanger, and the source heat exchanger;
a first electronic expansion valve (EEV) disposed on the refrigerant circuit between the first three-way coupler and the second load heat exchanger;
a second EEV disposed on the refrigerant circuit between the first three-way coupler and the source heat exchanger;
a check valve disposed on the refrigerant circuit between the first three-way coupler and the first load heat exchanger;
a first four-way diverting valve disposed on the refrigerant circuit between the compressor and the first load heat exchanger;
a second four-way diverting valve disposed on the refrigerant circuit between the first four-way diverting valve, the second load heat exchanger, the source heat exchanger, and the compressor;
a second three-way coupler disposed on the refrigerant circuit between the first four-way diverting valve, the second four-way diverting valve, and the compressor; and
a controller configured to continuously monitor a pressure differential across the compressor and (1) maintain an operating speed of the compressor when the pressure differential is above a set point, (2) increase the operating speed of the compressor when the pressure differential is below the set point and when the operating speed of the compressor is below an upper limit, or (2) stop the compressor when the pressure differential is below the set point and the operating speed of the compressor is above the upper limit.

16. The heat pump system of claim 15, wherein in a space cooling mode for the second load,
the first EEV is open,
the second EEV is closed,
the first four-way diverting valve is configured to divert the refrigerant from the compressor to the second four-way diverting valve and from the first load heat exchanger to the second three-way coupler, and
the second four-way diverting valve is configured to divert the refrigerant from the first four-way diverting valve to the source heat exchanger and from the second load heat exchanger to the second three-way coupler.

17. The heat pump system of claim 15, wherein in a space heating mode for the second load,
the first EEV is open,
the second EEV is closed,
the first four-way diverting valve is configured to divert the refrigerant from the compressor to the second four-way diverting valve and from the first load heat exchanger to the second three-way coupler, and
the second four-way diverting valve is configured to divert the refrigerant from the first four-way diverting valve to the second load heat exchanger and from the source heat exchanger to the second three-way coupler.

18. The heat pump system of claim 15, wherein in a water heating mode for the first load,
the first EEV is closed,
the second EEV is open,
the first four-way diverting valve is configured to divert the refrigerant from the compressor to the first load heat exchanger and from the second four-way diverting valve to the second three-way coupler, and
the second four-way diverting valve is configured to divert the refrigerant from the second load heat exchanger to the first four-way diverting valve and from the source heat exchanger to the second three-way coupler.

19. The heat pump system of claim 15, wherein in a water heating mode for the first load and a space cooling mode for the second load,
the first EEV is open,
the second EEV is closed,
the first four-way diverting valve is configured to divert the refrigerant from the compressor to the first load heat exchanger and from the second four-way diverting valve to the second three-way coupler, and
the second four-way diverting valve is configured to divert the refrigerant from the source heat exchanger to the first four-way diverting valve and from the second load heat exchanger to the second three-way coupler.

20. A heat pump system, comprising:
a refrigerant circuit comprising
a compressor to circulate refrigerant, the compressor having an inlet and an outlet;
first and second load heat exchangers to respectively exchange heat with first and second loads;
a source heat exchanger to exchange heat with a source;
a first three-way coupler between the first and second load heat exchangers and the source heat exchanger;
a first expansion valve between the first three-way coupler and the second load heat exchanger;
a second expansion valve between the first three-way coupler and the source heat exchanger;
a check valve between the first three-way coupler and the first load heat exchanger to block refrigerant flow from the first three-way coupler to the first load heat exchanger;
a first four-way diverting valve between the compressor and the first load heat exchanger;
a second four-way diverting valve between the first four-way diverting valve, the second load heat exchanger, and the source heat exchanger; and
a second three-way coupler between the first and second four-way diverting valves and the compressor; and
a controller configured to continuously monitor a pressure differential across the compressor, wherein
if the pressure differential is above a set point, the controller is configured to maintain an operating speed of the compressor;
if the pressure differential is below the set point and the operating speed of the compressor is below an upper limit, the controller is configured to increase the operating speed of the compressor, and
if the pressure differential is below the set point and the operating speed of the compressor is at or above the upper limit, the controller is configured to stop the compressor.

21. The heat pump system of claim 20, wherein the controller is configured to increase the operating speed of the compressor by a predetermined incremental amount.

22. The heat pump system of claim 20, wherein the controller is configured to selectively actuate the first and second four-way diverting valves to effect a space cooling only mode, a space heating only mode, a water heating only mode, and a water heating and space cooling mode.

* * * * *